US011251952B2

(12) United States Patent
Lamas-Linares et al.

(10) Patent No.: US 11,251,952 B2
(45) Date of Patent: Feb. 15, 2022

(54) QUANTUM SECURE CLOCK SYNCHRONIZATION BASED ON TIME-ENERGY AND POLARIZATION ENTANGLED PHOTON PAIRS

(71) Applicant: Board of Regents, The University of Texas System, Austin, TX (US)

(72) Inventors: Antia Lamas-Linares, Austin, TX (US); James Troupe, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 328 days.

(21) Appl. No.: 16/569,280

(22) Filed: Sep. 12, 2019

(65) Prior Publication Data
US 2020/0084033 A1 Mar. 12, 2020

Related U.S. Application Data

(60) Provisional application No. 62/730,356, filed on Sep. 12, 2018.

(51) Int. Cl.
*H04B 10/00* (2013.01)
*H04L 9/12* (2006.01)
(Continued)

(52) U.S. Cl.
CPC .............. *H04L 9/12* (2013.01); *G06N 10/00* (2019.01); *H04B 10/50* (2013.01);
(Continued)

(58) Field of Classification Search
CPC ..................................................... H04B 10/70
See application file for complete search history.

(56) References Cited

U.S. PATENT DOCUMENTS 7,286,444 B1 * 10/2007 Bahder .................... G04G 7/02
250/336.1
7,684,015 B2 * 3/2010 Shih ........................ G01S 19/23
356/4.01
(Continued)

OTHER PUBLICATIONS

Bahder, Thomas B. et al., "Clock Synchronization Based on Second-Order Quantum Coherence of Entangled Photons," AIP Conference Proceedings 734, pp. 395-398, Nov. 17, 2004.
(Continued)

*Primary Examiner* — Daniel G Dobson

(57) ABSTRACT

Systems and methods for quantum clock synchronization are provided. Various embodiments can use time-energy and polarization entangled photons to securely extract the absolute time difference between two remote clocks. In some embodiments, two parties can each have a source of entangled photons. Each party can detect one member of the pair locally and time stamp the detection time, while the other photon gets sent over a common channel (single optical mode) to the other party where the transmitted photon is detected and time stamped. The time stamp values can be shared over an open authenticated channel and each receiver can run a cross-correlation of the detection times. The authenticity and non-spoofability of the timing signal are ensured if each party does not just perform a simple time of arrival measurement but also incorporate polarization measurements whose joint values constitute a Bell test.

22 Claims, 7 Drawing Sheets

(51) Int. Cl.

| | |
|---|---|
| *H04L 7/00* | (2006.01) |
| *H04B 10/70* | (2013.01) |
| *G06N 10/00* | (2022.01) |
| *H04B 10/50* | (2013.01) |
| *H04L 9/08* | (2006.01) |
| *H04B 10/61* | (2013.01) |
| *H04J 14/00* | (2006.01) |

(52) U.S. Cl.
CPC ......... *H04B 10/6151* (2013.01); *H04B 10/70* (2013.01); *H04L 7/0075* (2013.01); *H04L 9/0852* (2013.01)

(56) References Cited

U.S. PATENT DOCUMENTS

2017/0317814 A1* 11/2017 Grice .................. G06F 1/12
2018/0294946 A1* 10/2018 Sinclair .............. H04B 10/112

OTHER PUBLICATIONS

Bhatti, Jahshan et al., "Hostile Control of Ships Via False GPS Signals: Demonstration and Detection," Journal of the Institute of Navigation, vol. 64, No. 1, pp. 51-66, Spring 2017.
Chuang, Isaac L., "Quantum Algorithm for Distributed Clock Synchronization," Physical Review Letters, vol. 85, No. 9, pp. 2006-2009, Aug. 28, 2000.
Eddington, A. S., Review of "The Mathematical Theory of Relativity," 2nd Edition, 5 pages, 1924.
Einstein, A., "On the Electrodynamics of Moving Bodies," 24 pages, Jun. 30, 1905.
Giovannetti, Vittorio et al., "Conveyor-Belt Clock Synchronization," Physical Review A, vol. 70, pp. 043808-1-043808-8, Oct. 12, 2004.
Giovannetti, Vittorio et al., "Quantum-Enhanced Positioning and Clock Synchronization," Nature, vol. 412, pp. 417-419, Jul. 26, 2001.
Hafezi, Mohammad et al., "Optomechanically Induced Non-Reciprocity in Microring Resonators," Optics Express, vol. 20, No. 7, 13 pages, Mar. 26, 2012.
Hawkes, Tom et al., "Time Warfare: Threats to GPS Aren't Just About Navigation and Positioning," http://www.defenseone.com/ideas/2017/05/time-warfare-anti-gps-arent-just-about-navigation-and-positioning/137724/, 5 pages, May 10, 2017.
Ho, Caleb et al., "Clock Synchronization by Remote Detection of Correlated Photon Pairs," New Journal of Physics, No. 11, 14 pages, Apr. 30, 2009.
Hong, C. K. et al., "Measurement of Subpicosecond Time Intervals Between Two Photons by Interference," Physical Review Letters, vol. 59, No. 18, pp. 2044-2046, Nov. 2, 1987.
Ilo-Okeke, Ebubechukwu O. et al., "Remote Quantum Clock Synchronization Without Synchronized Clocks," Nature Partner Journals, 6 pages, Aug. 15, 2018.
Imoto, N. et al., "Quantum Nondemolition Measurement of the Photon Number Via the Optical Kerr Effect," Physical Review A, vol. 32, No. 4, pp. 2287-2292, Oct. 1985.
Jozsa, Richard et al., "Quantum Clock Synchronization Based on Shared Prior Entanglement," Physcial Review Letters, vol. 85, No. 9, pp. 2010-2013, Aug. 28, 2000.
Kerns, Andrew J. et al., "Unmanned Aircraft Capture and Control Via GPS Spoofing," Journal of Field Robotics, vol. 31, No. 4, pp. 617-636, 2014.
Lenferink, Erik J. et al., "Coherent Optical Non-Reciprocity in Axisymmetric Resonators," Optics Express, vol. 22, No. 13, 13 pages, Jun. 30, 2014.
Levine, Judah, "Introduction to Time and Frequency Metrology," Review of Scientific Instruments, vol. 70, No. 6, pp. 2567-2596, Jun. 1999.
Ling, Alexander et al., "Experimental Quantum Key Distribution Based on a Bell Test," Physical Review A, vol. 78, pp. 320301-1-020301-4, Aug. 20, 2008.
Marcikic, Ivan et al., "Free-Space Quantum Key Distribution With Entangled Photons," Applied Physics Letters, vol. 89, pp. 101122-1-101122-3, Sep. 8, 2006.
Narula, Lakshay et al., "Requirements for Secure Clock Synchronization," IEEE Journal of Selected Topics in Signal Processing, vol. 12, No. 4, pp. 749-762, Aug. 2018.
Quan, Runai et al., "Demonstration of Quantum Synchronization Based on Second-Order Quantum Coherence of Entangled Photons," Scientific Reports, 8 pages, Jul. 25, 2016.
Reiserer, Andreas et al., "Nondestruction Detection of an Optical Photon," Science, vol. 342, pp. 1349-1351, Dec. 13, 2013.
Shen, Zhen et al., "Experimental Realization of Optomechanically Induced Non-Reciprocity," Nature Photonics, vol. 10, pp. 657-661, Oct. 2016.
Shepard, Daniel P. et al., "Evaluation of the Vulnerability of Phasor Measurement Units to GPS Spoofing Attacks," International Journal of Critical Infrastructure Protection, vol. 5, pp. 146-153, Oct. 2, 2012.
Sobel, Dava, Abstract for "Longitude: The True Story of a Lone Genius Who Solved the Greatest Scientific Problem of His Time," 3 pages, 1995.
University of Texas, "Secure Perception," http://radionavlab.ae.utexas.edu/index.php?option=com_content&view=article&id=377:secure-perception&catid=25&Itemid=27, 2 pages, 2012.
Valencia, Alejandra et al., "Distant Clock Synchronization Using Entangled Photon Pairs," Applied Physics Letters, vol. 85, No. 13, pp. 2655-2657, Sep. 27, 2004.
Xiao, Yun-Feng et al., "Quantum Nondemolition Measurement of Photon Number Via Optical Kerr Effect in an Ultra-High-Q Microtoroid Cavity," Optics Express, vol. 16, No. 26, 14 pages, Dec. 22, 2008.

* cited by examiner

| additional_fibre_length(m) | offset_pfind(ns) | Peak_separation_pfind(ns) | offset(ns) | Peak_separation(ns) |
|---|---|---|---|---|
| 0 | -3827495.5 +/- 1 | 17 +/- 2 | -3827495.455 +/- 0.015 | 16.78 +/- 0.021 |
| 5 | -3827495.5 +/- 1 | 67 +/- 2 | -3827495.498 +/- 0.030 | 67.099 +/- 0.042 |
| 30 | -3827495.5 +/- 1 | 315 +/- 2 | -3827495.458 +/- 0.015 | 315.276 +/- 0.021 |
| 50 | -3827495.5 +/- 1 | 511 +/- 2 | -3827495.473 +/- 0.022 | 511.036 +/- 0.031 |

ACQUISITION TIME: 200s
RESULT FOR OFFSET MEASUREMENT: 3827495.5ns
ERROR: ~15-30ps

FIG. 5

QUANTUM SECURE CLOCK SYNCHRONIZATION BASED ON TIME-ENERGY AND POLARIZATION ENTANGLED PHOTON PAIRS

CROSS-REFERENCE TO RELATED APPLICATIONS

This application claims priority to U.S. Provisional Application Ser. No. 62/730,356 filed Sep. 12, 2018, which is incorporated herein by reference in its entirety for all purposes.

TECHNICAL FIELD

Various embodiments of the present technology generally relate to clock synchronization. More specifically, some embodiments of the present technology relate to quantum secure clock synchronization based on time-energy and polarization entangled photon pairs.

BACKGROUND

Keeping an accurate track of time and our ability to have remote clocks agree on the current time has been a subject of dedicated research efforts since at least 1714 when the British government established the Board of Longitude to find a method of reliably determining the longitude of ships at sea.

Currently, there exist several Global Navigation Satellite Systems (GNSS): the first such system, the United States Global Positioning System (GPS), the European Union Galileo system, the Russian GLONASS, and China's soon to be completed BeiDou system. While the common perception of the purpose of these networks is to provide precise and almost universally available positioning information, in reality these networks provide and distribute a more fundamental and even more widely useful resource: a precise and universal common time reference. The ubiquity of GPS and other GNSS timing signals has led to their utilization in many aspects of modern civilian society, e.g. computer networking, mobile phone networks, financial transactions networks, and electric power distribution. In addition, are a growing number of military applications that require a precision common time reference, such as distributed sensing, data fusion, secure communications, and electronic warfare.

However, given the critical and widespread reliance on distributed precision time, the security of these networks is generally quite weak. The signals that transfer time information can be spoofed by an adversary who wishes to disrupt or corrupt the timing networks. While military use of GNSS does utilize additional security measures to detect and deter spoofing, these countermeasures generally add significant complexity and are still potentially vulnerable to sophisticated adversaries. Thus, there is a compelling need for fundamentally new methods for efficiently and securely distributing high precision time information. Due to the fact that even highly precise atomic clocks will drift relative to each other surprisingly quickly, a central requirement for the functioning of a secure time network is the ability to (re-)synchronize two clocks in a trusted manner.

SUMMARY

Systems and methods are described for clock synchronization. More specifically, some embodiments of the present technology relate to quantum secure clock synchronization based on time-energy and polarization entangled photon pairs. In some embodiments, a method for synchronizing clocks at different locations or sites can include generating, at random times, pairs of entangled photons. Time stamps each representing a detection time that a first photon in each of the pairs of entangled photons was detected can be recorded. A second photon in each of the pairs of entangled photons can be transmitted through a quantum channel (e.g., via α single mode optical channel) and to a remote receiver. Arrival times of the second photon in each of the pairs of entangled photons as measured at a remote device having a remote clock and a photon polarization state of the second photon as identified by the remote device can be received (e.g., via a communication channel, a public communication channel, an encrypted communication channel, a private communication channel, etc.).

In some embodiments, there is a source of entangled photons at each site and the cross-correlation is obtained from combining detections from photons originating at each of the sites and propagating through a common channel. This results in two peaks and to identify the offset between the local clock and the remote clock, some embodiments of the method can compute half a distance between the two peaks. An offset between the local clock and the remote clock can be identified from the cross-correlation of the arrival time of the second photon with the time stamps of the first photon created. A time of the local clock can be updated using the offset.

In some embodiments, a first photon polarization state of each of the first photons of the pairs of entangled photons were detected locally can be measured. A second photon polarization state of each of the second photons of the pairs of entangled photons as identified by the remote device can be received, via the quantum communication channel (e.g., a single mode optical fiber, a free space optical channel, waveguide in an optical circuit, or other channel that preserves the quantum state up to unitary transformation).

Embodiments of the present invention also include computer-readable storage media containing sets of instructions that when executed by one or more processors cause one or more machines to perform the methods, variations of the methods, and other operations described herein.

In some embodiments, a dual emitter and receiver can include a local clock, a source, a photon polarization analyzer, a time recordation module, and/or other components. The source can be configured to generate entangled photon pairs. One member of the entangled photon pairs can be coupled into a first single mode optical channel providing a local path to analyze the one member locally. The second member of the entangle photon pairs can be coupled into a second single mode optical channel providing an optical path to a remote device. The photon polarization analyzer can be coupled the first single mode optical channel. In some embodiments, the photon polarization analyzer can be configured to measure a polarization state of one member of the entangled photon pairs in an arbitrary basis. The time recordation module can be configured to measure a detection time of the one member of the entangled photon pairs, wherein the detection time is identified based on the local clock.

In some embodiments, the photon polarization analyzer can include a collection of wave plates and a beam splitter. The collection of wave plates can allow arbitrary transformation of the polarization state of the photon. The beam splitter can divide the first single mode optical channel into two paths. The dual emitter and receiver may also include, in some embodiments, a random number generator to generate a random number that is used as an input to the photon polarization analyzer to select the arbitrary basis. The dual emitter and receiver may also include a beam splitter connected to the second single mode optical channel and a second photon polarization analyzer coupled to the beam splitter. The second photon polarization analyzer can be configured to measure the polarization state of photons arriving via the second single mode optical channel. In some embodiments, the dual emitter and receiver can also include a communication module to receive time stamps of photons received at the remote device and/or a cross-correlation analyzer to generate a cross-correlation between the time stamps received from the remote device and the detection times recorded locally. The cross-correlations between the time stamps and the detection times result in two peaks, and the dual emitter and receiver further comprising an adjustment module to computing an offset amount between the local clock and a remote clock from the two peaks in the cross-correlation.

In various embodiments, pairs of entangled photons can be generated at random times. Based on a local clock, time stamps can be generated each representing a detection time that a first photon in each of the pairs of entangled photons was detected. A second photon in each of the pairs of entangled photons can be transmitted via a single mode optical channel and to a remote receiver. Arrival times of the second photon in each of the pairs of entangled photons as measured at a remote device having a remote clock and a photon polarization state of the second photon as identified by the remote device can be received via a communication channel (e.g., a public communication channel, encrypted communication channel). Some embodiments can then identify an offset between the local clock and the remote clock by computing a cross-correlation of the arrival time of the second photon with the time stamps of the first photon created. A time of the local clock can be updated using the offset.

The cross-correlation may include at least two peaks and identifying the offset between the local clock and the remote clock can includes computing half a distance between the two peaks. Some embodiments can measure a first photon polarization state of each of the first photons of the pairs of entangled photons were detected locally. A second photon polarization state of each of the second photons of the pairs of entangled photons as identified by the remote device can be received via the communication channel. Some embodiments can correlate the first photon polarization state with the second photon polarization state to determine quantum channel security. The quantum channel security can include spoofability.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

FIG. 5 illustrates the results of an offset computation in accordance with some embodiments of the present technology.

Figure 1:
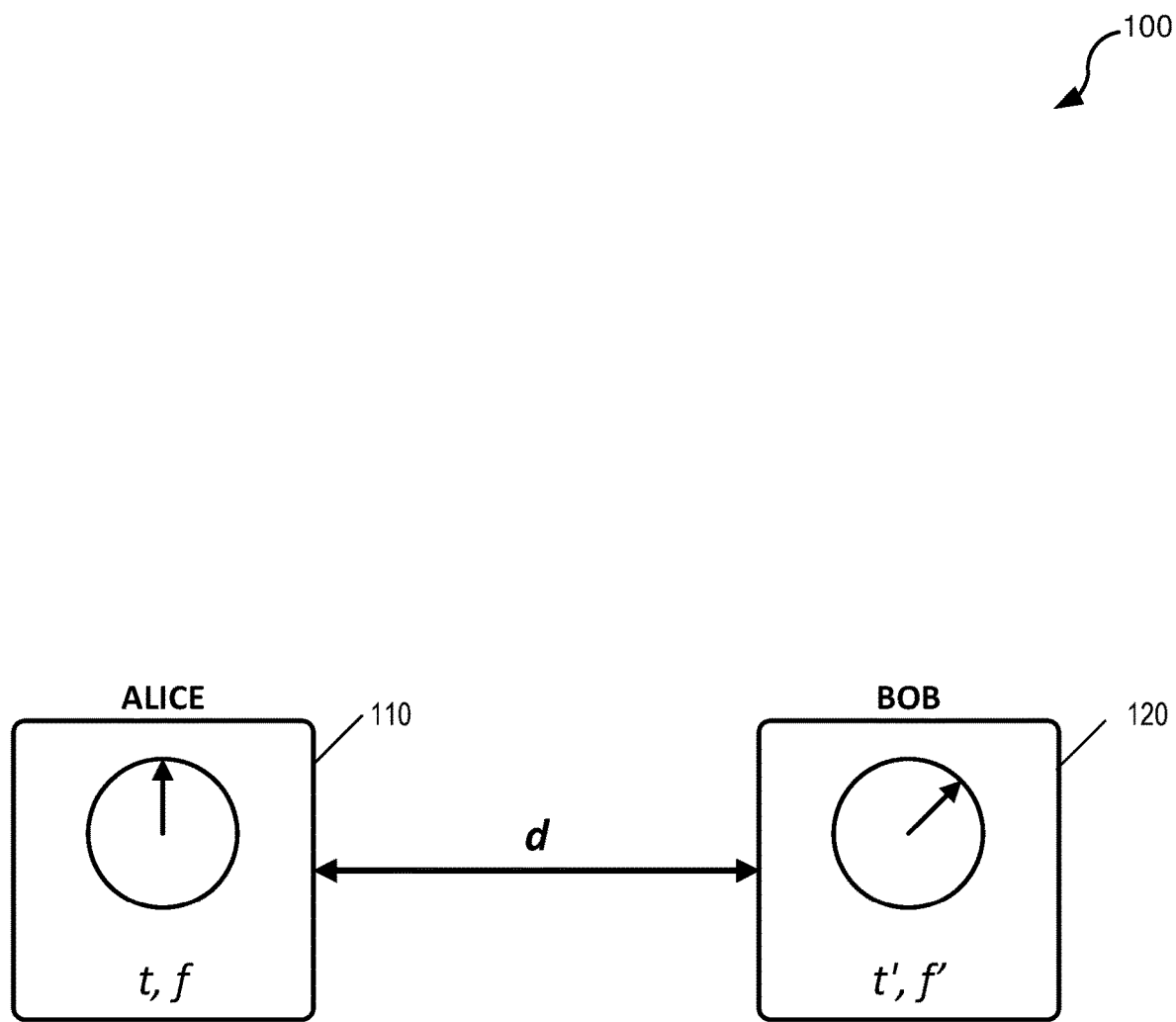
FIG. 1 illustrates an example of a remote clock needing to be synchronized in accordance to some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to clock synchronization. More specifically, some embodiments of the present technology relate to quantum secure clock synchronization based on time-energy and polarization entangled photon pairs. Clock synchronization underlies a great deal of our infrastructure, from cell phones networks to navigation. Unfortunately, the signals used to distribute timing information can in principle be spoofed by a malicious actor giving them the ability to control the indicated relative time between network clocks. This can allow the adversary to affect the functioning of systems that rely on distributed time, e.g. navigation applications using GPS. While there are some methods for countering spoofing in current timing networks, these methods have fundamental and practical limitations in providing both high precision clock synchronization and security. These limitations arise due to the use of only signals based on classical information which can be easily copied with very high fidelity.

In contrast, various embodiments of the present technology provide novel systems, methods, and protocols that can securely synchronize remote clocks. Some embodiments build on techniques from quantum communication to provide time synchronization that is verified, secure, and more precise, and does not need to be aware of the distance or propagation times between the clocks. By using time-energy and polarization of entangled photons, various embodiments, can securely extract the absolute time difference between two remote clocks.

For example, in some embodiments, two parties Alice and Bob, can each have a source of entangled photons. They each detect one member of the pair locally and time stamp the detection time, the other photon gets sent over a common quantum channel (e.g., single optical mode) to the other party where it is detected and time stamped. The time stamp values are shared over an open authenticated channel and Alice and Bob run a cross-correlation of the detection times. This results on two peaks in the cross correlation. The offset between the clocks is half of the distance between the peaks. The authenticity and non-spoofability of the timing signal are ensured if Alice and Bob do not just perform a simple time-of-arrival measurement, but also incorporate polarization measurements (whose joint values constitute a Bell test). This method avoids security vulnerabilities of all other currently known methods.

Some embodiments can use a single (possibly dedicated) single mode optical communication channel between the parties performing the synchronization. A malicious attacker which can efficiently perform a quantum non-demolition measurement could potentially break the security. Clock synchronization is closely related to navigation, so secure navigation and positioning would be an application using the same techniques. Various embodiments of the new clock synchronization method described herein can use resources from quantum information to both carry very precise time information and secure it from manipulation by an adversary.

Some embodiments of the present technology utilize the time-energy entanglement of photon pairs from spontaneous down-conversion to generate and distribute timing information between two distant parties without a priori knowledge of the propagation time between them. This common timing information is then used by the two parties to synchronize their local clocks. A network of such parties can therefore quickly establish and maintain a common network time. Furthermore, the trustworthiness of the distributed time information is protected against hostile manipulation by the two parties monitoring the polarization entanglement between the photon pairs. The inability of an attacker to perfectly copy quantum information (quantum no-cloning theorem) prevents measuring, copying, or altering the polarization states of the transmitted photons in a non-detectable way, and thus prevents successful spoofing of the signals.

For example, two points connected via a standard telecom single mode fiber or a free space optical link can use entangled photon pairs produced in parametric down conversion to securely synchronize their local clocks. In accordance with some embodiments, each end point only needs a source of entangled photons, time tagging single photon detectors, a polarization filter and an open channel accessible by the other communicating party. This synchronization will be secure against undetected interference by a malicious attacker. This method is only vulnerable to an attacker that can break the symmetry of the light propagation speed in the channel for all polarization and frequencies in the exact same amount.

The clock synchronization techniques used in various embodiments relies on the use of entangled photon pairs. By their nature, quantum states encoded in photons provide a certain amount of resilience against malicious attacks (spoofing). Some embodiments provide methods for detecting the introduction of an asymmetric delay in the channel by a malicious party. This can be detected by a particular set of measurements on the entangled photon pairs used in the synchronization and it is a fundamental quantum effect that cannot be replicated by an attacker. In essence, this last step guaranties security of the channel in a fairly general scenario.

Various embodiments of the present technology provide for a wide range of technical effects, advantages, and/or improvements to computing systems, transceivers, and infrastructure components. For example, various embodiments include one or more of the following technical effects, advantages, and/or improvements: 1) secure synchronization of remote clocks; 2) integrated use of properties of entangled photons to both perform clock synchronization and ensure that the result cannot be falsified by a malicious party thereby avoiding security vulnerabilities of traditional synchronization methods; 3) detection, reduction or elimination of malicious outside interference; 4) use of unconventional and non-routine computer operations for detecting the introduction of an asymmetric delay in the channel by a malicious party; 5) non-routine techniques for clock synchronization that are independent on the signal propagation time between the parties; and/or 6) non-routine techniques for clock synchronization that do not require a priori knowledge of that time or the distance separating the parties.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to general clock synchronization, embodiments of the present technology are equally applicable to specific clock synchronization applications including, but not limited to, smart power grids, financial networks, mobile phone and other communication networks, satellite navigation, and autonomous vehicles.

One application of the present technology includes position verification with trusted parties. For example, if a ship gets its navigation information from GPS and suspects the GPS is compromised. If they have the ability to communicate optically with, for example, a naval base that has an independent trusted time, they can compare their clock offsets with respect to the satellite and decide whether the GPS signal is trustworthy.

Some embodiments of the present technology can be used in the distribution of network time among space assets. For example, a set of satellites can use the various embodiments of the present technology to share a secure common time reference among all. This could be done, for example, via a series of linked point to point entanglement distribution steps.

Various embodiments can be used for synchronization of independent communication networks. For example, two different networks, (e.g. communication, electrical) can establish a link between two points (one in each network) to synchronize their respective network times using various embodiments as described herein. In some applications an augmentation of current non-secure timing signals with a secured timing beacon can be provided. For example, an existing timing network (e.g. GPS) could add the capability described to a fraction of its nodes and thus provide secure timing for a fraction of the time or a fraction of its users. This allows comparing the existing classical signal with the quantum sync signal to verify the former.

Another application of the present technology includes extremely precise secure clock synchronization for high frequency trading. If a financial institution performing trades got hacked such that their clocks are, for example, 1 microsecond delayed in their trades this can result in very large losses. A bank could establish a quantum channel to the "master source" for time in the trading world and thus ensure that they effectuate transactions at the right times.

Many parts of the basic civilian and military infrastructure depend on accurate clock synchronization. As such various embodiments of the present technology directly apply to cell phone networks, the electrical grid, and large-scale measurements that involve accurately combining signals from remote locations.

Another application of the present technology includes synchronizing the nodes of a quantum network. An eventual quantum network will need to be exquisitely synchronized to allow for the execution of quantum primitive operations such as teleportation and entanglement swapping. Various embodiments provide a natural procedure to perform the synchronization over such a network. There is current development of satellite as well as ground-based quantum cryptography networks. Various embodiments of the synchronization protocol would fit naturally in such a network and ensure all nodes are in sync in a secure manner. One application of the present technology includes assured position, navigation, and timing in "A2AD" Anti Access/Area Denial (A2/AD). In order to: "Provide resilient mission command on the move to wage the maneuver ISR (Intelligence, Surveillance, Reconnaissance), Joint fires, and sustainment fights to retain and exploit the initiative against a peer adversary in an inherently contested cyber and electromagnetic environment."

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of two clocks needing to be synchronized in accordance to some embodiments of the present technology. Various embodiments of the present technology provide protocols for secure time synchronization which is able to determine an absolute time offset between two remote clocks and does not rely on pre-existing knowledge of the relative position of the clocks or the propagation time of the signal used for synchronization. Using techniques from quantum communication, various embodiments of the present technology can be resistant against a broad class of spoofing attacks by a malicious party, an area of increasing interest in classical time distribution.

Quantum mechanical effects are at the heart of the best clocks in existence but we will use the terms "quantum time synchronization protocols" in a more limited sense to refer to those protocols that use techniques related to quantum information for improving aspects of clock synchronization. There are several ways in which these quantum effects are utilized; some of the protocols focus on engineering the quantum state such that there is an improvement in the signal to noise ratio of the resulting measurement, others share a large amount of prior entanglement and thus avoid both Einstein-style synchronization signals and Eddington's slow clock transport, another class exploits quantum effects to achieve immunity towards some environmental disturbances such as dispersion, and yet another group uses measurements of the second order correlation function of photon pairs produced in SPDC. It is this last technique, augmented with a symmetrization of the production and detection of the photon pairs, plus a security layer based on Bell inequalities, that constitutes the basis of some embodiments of the protocol for quantum secure clock synchronization.

Broadly speaking, clock synchronization refers to two different but related tasks. The first is frequency distribution, where we are concerned with the difference in "ticking rates" between two separate clocks (syntonization). The second is that of time distribution where our concern is the offset at a particular instant between the reported time of two remote clocks. Many embodiments of the present technology will focus on the later task. The discussion is organized as follows.

Classical Clock Synchronization

In this section the requirements for securely establishing the offset between two distant clocks when using signals that convey only classical information are reviewed.

The problem: Alice 110 and Bob 120 are separated by some fixed distance and each possesses a local clock with an unknown difference in the times displayed by them. Choosing Alice's clock as the "Master" clock, we will refer to the difference time readings as the clock offset $\delta$ of Bob's clock. Thus, $t'=t+\delta$, where t is Alice's clock reading for an event and t' is Bob's clock reading for the same event assuming that Alice and Bob are co-located. When Alice 110 and Bob 120 are not co-located, a secure clock synchronization protocol attempts to measure and distribute information about the relative clock offset such that an adversary with access to the information channels used is unable to alter the inferred offset without being detected by Alice 110 and Bob 120. Therefore, secure clock synchronization is an example of what we will call secure metrology, an interesting combination of the more common secure communication and metrology tasks.

One-Way Protocols

One-way classical clock synchronization protocols are based on the simple idea of Alice transmitting a signal (possibly using cryptographic authentication) containing a timestamp of the transmission time t according to her clock. Bob receives the signal and records the time of reception, t', according to his clock. If Bob 120 knows the true propagation time between Alice and himself, $\Delta t_{AB}$, then he can calculate the offset via $\delta=t'-t-\Delta t_{AB}$. While this has the benefit of being a very simple protocol, it is inherently insecure since it assumes that the propagation time is known and not under the control of an adversary. Therefore, even if the signals used are authenticated and encrypted, one-way protocols are easily compromised by the introduction of a simple delay by an adversary, who we will call Damon, between Alice 110 and Bob 120.

Two-Way Protocols

The main difference between the one-way and two-way protocols is the ability of Alice to estimate the propagation time between herself and Bob 120 by measuring the round-trip time (RTT). Under the assumption that the signal propagation time is directionally symmetric, the propagation time is half of the RTT. If the channel between Alice 110 and Bob 120 is known and accurately modeled, then Alice 110 can compare the measured RTT to the RTT predicted by the model allowing her to detect any delay attacks that respect the assumed directional symmetry. As with all classical protocols, security also requires cryptographic authentication of the signals used to transmit the time information.

Requirements for Security of Classical Protocols

It is important to clarify what is meant by security in the context of clock synchronization. Unlike with cryptographic protocols, a formal mathematical definition of security does not exist. In clock synchronization, the basis for security is an essentially physical consideration of the abilities of an adversary within the laws of physics combined with whatever technical constraints are known (or assumed) to limit the adversary.

The following is one list of security requirements for all clock synchronization protocols that use classical signals: (1) Alice and Bob must use an authenticated encryption scheme to secure the signals used for transmitting timing information in order to prevent successful counterfeiting by Damon; (2) The actual propagation time between Alice and Bob must not be reducible by more than a known, fixed amount L that will also set the accuracy limit of the synchronization protocol; and (3) The actual round trip time must be known a priori to Alice and must be measurable by Alice with an inaccuracy smaller than L.

The purpose of these requirements is to allow Alice the ability to use her clock to estimate the propagation time between her and Bob via the RTT of the photons. By comparing her estimates to the expected propagation time, Alice is able to detect Damon whenever the difference exceeds the limit L.

There are many limitations in these classical protocols. The necessity of Alice (or Bob) knowing with significant precision what the true channel propagation time is and being able to place a trustworthy lower limit on the reducibility of this time are quite hard to satisfy. For example, in the simple case of free space propagation, it would require Alice and Bob to a priori have a trustworthy estimate of the relative distance between them. Furthermore, the precision of this distance estimate would set the secure limit for the precision of the clock synchronization protocol.

Quantum Protocol

Entangled photon pairs produced by SPDC are extensively used in quantum information protocols. It has long been known that the emission times of the photons in the pair are very tightly time correlated even if the emission event itself happens at random times. This can be exploited in clock synchronization protocols by measuring the second order correlation function. The technique has also used extensively in non-pulsed quantum cryptography to find the relative time difference between Alice's and Bob's clocks and thus identify "coincidences" that correspond to the detection of two photons from the same pair. In such a scenario Alice and Bob each receive one member of a pair of photons produced with SPDC. They record the time of arrival with respect to their local clock and then calculate a cross-correlation of the times of arrival to extract the relative time of arrival difference as measured by their local clocks. Our protocol builds on this basic idea to detect coincident events, and augments it by situating a source of entangled photons both at Alice's and at Bob's lab and having each of them detect one member of the pair locally and send the other member of the pair to be detected at the other site, all while using a common propagation channel between their labs as illustrated in FIG. 2.

Figure 2:
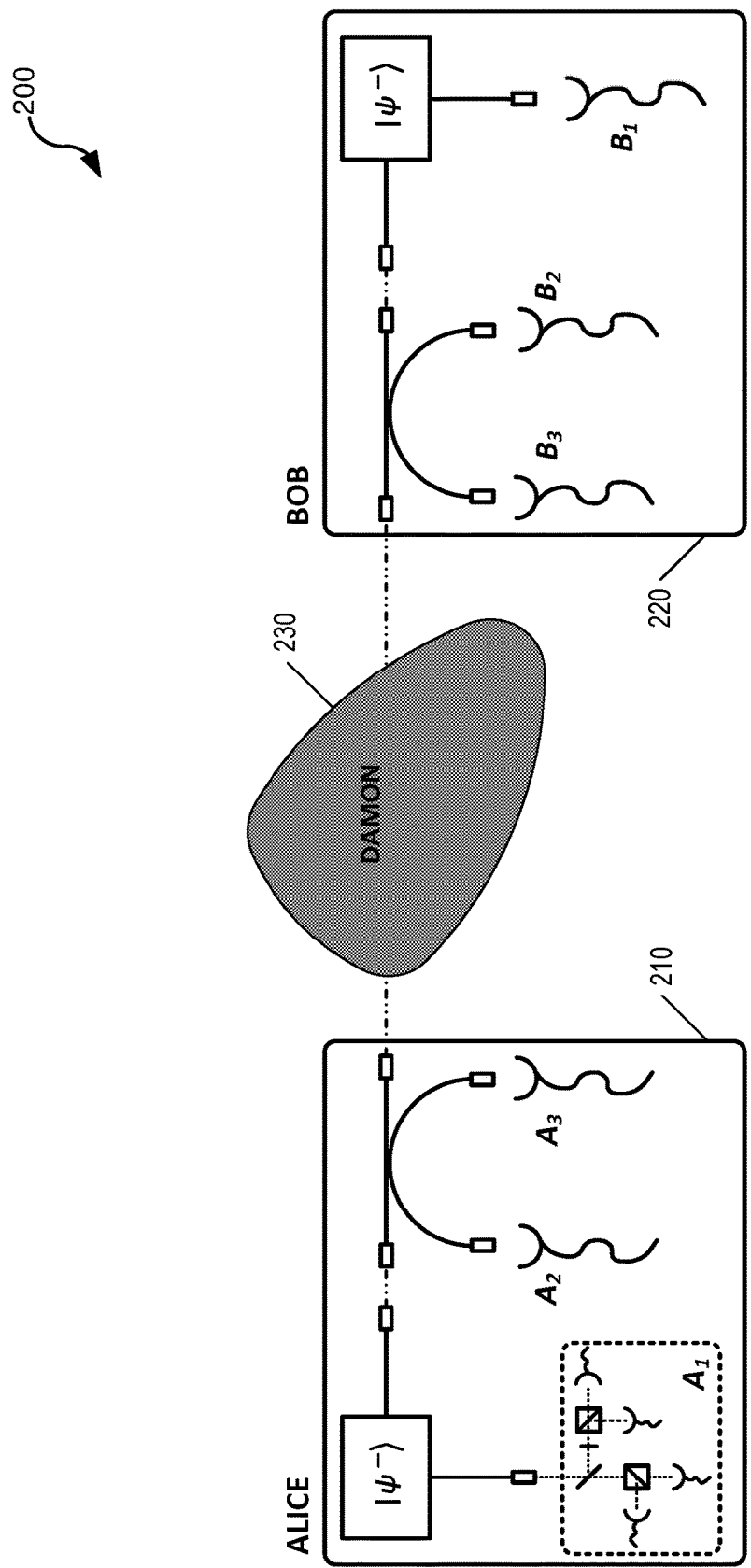
FIG. 2 illustrates an example of a set of components that may be used in accordance with one or more embodiments of the present technology.

FIG. 2 illustrates a proposed time synchronization experimental setup 200. Alice 210 and Bob 220 each have a source of polarization entangled pairs ($\psi-$) (e.g., produced by spontaneous parametric down-conversion (SPDC)) and a set of single photon detectors within their secure lab (denoted by a solid line). Each mode of propagation of the photons ends in a detector cluster able to perform polarization measurements, but only the cluster labeled as $A_1$ is fully represented in the figure. One member of the SPDC pair is detected locally at detector cluster $A_1$ in Alice's side and at cluster $B_1$ on Bob's side. The other member of the pair is coupled into a single-mode optical channel (e.g., an optical fiber or a free-space optical link) controlled by an adversary, Damon 230. Each of the propagating photons has a chance of being detected on the remote side by $A_2$ or $B_2$ for pairs originating at Bob's and Alice's side respectively. Times of arrival for all detected photons are recorded in each lab with respect to a local clock. Detectors $A_3$ and $B_3$ are under the control of either Alice or Bob and are included for completion but do not play a part in the discussion. The detector cluster illustrated for $A_1$ represents a possible passive measurement scheme for a CASH inequality. It uses a beam splitter followed by two polarizing beam splitters oriented at the appropriate angles for projection into the desired polarization state. Examples of components that may be used in various embodiments of the present technology (e.g., detector clusters, entanglement sources, and techniques for coupling the entanglement to the quantum channel) can be found in Appl. Phys. Lett. 89, 101122 (2006), "Free-space quantum key distribution with entangled photons" (ArXiv version is: https://arxiv.org/abs/quant-ph/0606072) which is incorporated by reference in its entirety for all purposes.

Time Offset Extraction

The numbers measured by Alice's (Bob's) local clock are debited by t (t') with a subscript denoting a particular indexed event. If Alice 210 and Bob 220 were at the same spatial location detecting the same pair event, the difference between the times of detection as measured by their local clocks would be $\delta=t-t'$, and this $\delta$ would be the time offset that we aim to determine. If Alice 210 and Bob 220 are at separate locations, the time of propagation of a signal between Alice 210 and Bob 220 is denoted as $\Delta t_{AB}$ ($\Delta t_{BA}$ for propagation in the opposite direction). The round-trip time of a signal originating from either Alice or Bob is $\Delta T = \Delta t_{AB} + \Delta t_{BA}$.

Additionally, since the channel is a single spatial mode and the signals propagating between Alice 210 and Bob 220 are identical in all degrees of freedom apart from propagation direction, we assume $\Delta t_{AB} = \Delta t_{BA} = \Delta t$. To calculate the absolute time difference between clocks, $\delta$, consider a photon pair produced at Alice's site. One of the members of the pair is detected locally at detector $A_1$ and the other member of the pair travels to Bob accumulating a travel time $\Delta t_{AB}$, and getting detected at $B_2$. For any particular pair event produced at Alice's site, the difference between the time labels recorded at Alice and Bob will be:

$$t'-t=\Delta t_{AB}+\delta.$$

Similarly, for any pair produced at Bob's site:

$$t-t'=\Delta t_{BA}-\delta.$$

These differences between the time labels can be extracted by calculating a cross-correlation between events at both sides. Consider first events produced on Alice's site. The detection events are translated into a function as:

$$a(t) = \sum_i \delta(t - t_i) dt$$

$$b(t') = \sum_j \delta(t - t'_j) dt.$$

Where i and j just index arbitrary detection events which can arise either from pairs or from other detector triggers such as stray light, dark counts, etc. The cross-correlation is computed as:

$$c_{AB}(\tau) = (a*b)(\tau) = \int a(t)b(t+\tau)dt,$$

and will have a maximum at $\tau = \tau_{AB} = \Delta t_{AB} + \delta$.

Likewise, if we consider those pairs created on Bob's site, we can extract another cross-correlation, $$c_{BA}(\tau) = (b*a)(\tau) = \int b(t)a(t+\tau)dt,$$

which will have a maximum at $\tau = \tau_{BA} = \Delta t_{BA} - \delta$.

From these we can extract both the round-trip time and the absolute time difference between clocks without making any prior assumptions about the length of the path between Alice and Bob.

$$\Delta T = \tau_{AB} + \tau_{BA}$$

$$\delta = \frac{1}{2}(\tau_{AB} - \tau_{BA}).$$

Security

The time extraction protocol just described includes several assumptions which need to be carefully examined if this protocol is performed in an adversarial context. The first assumption is that the signals that each party is receiving are truly originating as part of the same pair. Fortunately, the entanglement of the pairs provides us a built-in mechanism to ascertain exactly this. A measurement of a Bell inequality in the polarization degree of freedom will ensure that the pairs we are measuring and correlating to each other do indeed belong together. This check also ensures that the polarization degree of freedom has not been accessed by our adversary to extract any information as this would affect the results of the Bell inequality.

A Bell inequality in the polarization degree of freedom does not by itself guarantee that the timing information has not been manipulated. For example, an adversary could introduce an arbitrary delay that is polarization insensitive and this would not be detected in any meaningful way, as the effect would be to change the calculated values of $\tau_{AB}$ and $\tau_{BA}$. In a nutshell this is why conventional one-way protocols are vulnerable to delay attacks, and even classical two-way protocols need to impose strong conditions for security. For the protocol proposed here, a time delay introduced in this manner would have no effect on the calculated clock time offset $\delta$ because of the symmetrization of the sources and detection.

Thus, one final assumption is left—i.e., that of symmetry of the propagation times through the channel (i.e., $t_{AB} = t_{BA}$). This case can be formalized as the adversary, Damon, introducing an arbitrary delay that is dependent on the propagation direction added to the un-modified values, $$\Delta t_{AB}^d = \Delta t + D_1$$

$$\Delta t_{BA}^d = \Delta t + D_2.$$

If $D_1 \neq D_2$ and Alice and Bob believe the channel to be symmetric, then they would arrive at a Damon-determined value of $\delta^d$:

$$\tau_{AB}^d = \Delta t_{AB}^d + \delta^d$$

$$\tau_{BA}^d = \Delta t_{BA}^d - \delta^d$$

$$\delta^d = \frac{1}{2}(\tau_{AB}^d - \tau_{BA}^d) = \delta \frac{1}{2}(D_1 - D_2).$$

Thus, the time difference estimated by Alice and Bob would be off from the true value by one half of the magnitude of the unknown asymmetry.

It is worth now carefully revisiting the possible interference by an adversary. A first mode of attack has Damon modifying our measured values times of arrival of the photon pairs. For the source based at Alice's site, he clearly cannot influence the member of the pair that is detected locally, as this is all within Alice's secure area. He could modify Bob's detected time of arrival of the signals coming from Alice in a consistent way, but this would be equivalent to introducing a—possibly asymmetric—delay on the channel. Thus, we are left with the question of under what circumstances Damon can introduce a delay that is different depending on the direction in which the signal is propagating (or depending on whether the photon originates at Alice or at Bob).

Step by Step Protocol Description

Figure 3:
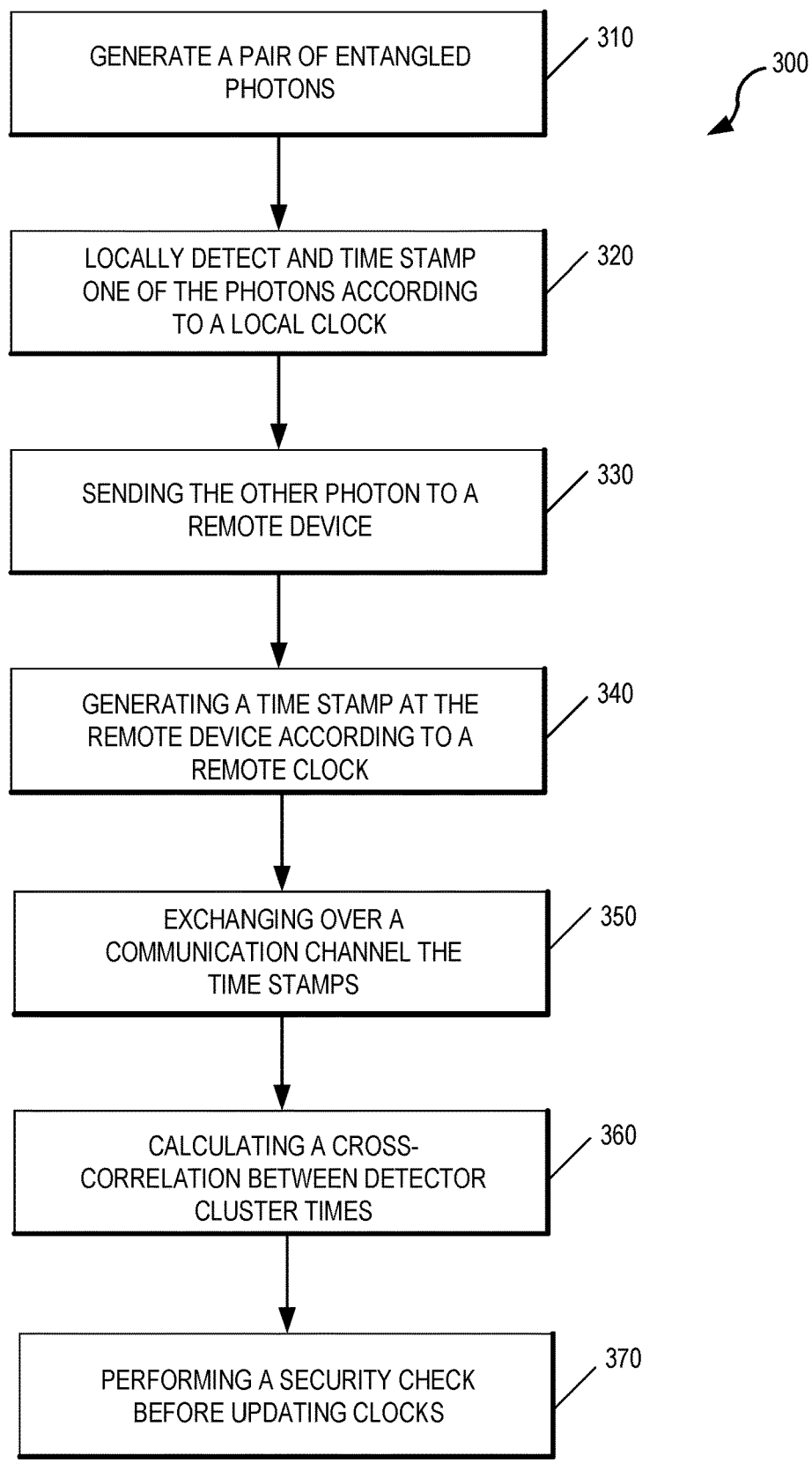
FIG. 3 is a flowchart illustrating a set of operations for operating a dual receiver and transmitter in accordance with some embodiments of the present technology.

FIG. 3 is a flowchart illustrating a set of operations for operating a dual receiver and transmitter in accordance with some embodiments of the present technology. As illustrated in FIG. 2, Alice 210 and Bob 220 each can have a source of polarization entangled photons within their secure laboratories. As illustrated in FIG. 3, generation operation 310 uses the sources to generate a pair of entangled photons.

During detection operation 320, one photon from each pair produced is detected locally and labeled according to a local clock. For Alice 210 the local detection happens in detector group $A_1$ and is tagged with times $t_1, t_2, \ldots, t_i$. The other photon produced at Alice's site is sent (e.g., during transmission operation 330) through the channel to Bob's laboratory, detected at $B_2$ and is tagged with times $t'_1, t'_2, \ldots, t'_j$ during time stamping operation 340. Likewise, for photon pairs produced at Bob's site we would have detections at $B_1$ and $A_2$ with time tags $t'_1, t'_2, \ldots, t'_m$ respectively.

Time offset extraction: Alice 210 and Bob 220 exchange over a public authenticated channel (e.g., during exchange operation 350) the time tags of photon detection times as measured by their local clocks and calculate (e.g., during cross-correlation operation 360) a cross-correlation between detector cluster times $A_1$ and $B_2$, and between $B_1$ and $A_2$. With this they are able to extract the time offset $\delta$ and round-trip time $\Delta T$ using the procedure described previously.

Security check: With the timing offset determined, Alice 210 and Bob 220 check the correlations between the individual detectors in groups $A_1$ and $B_2$ and groups $B_1$ and $A_2$ during security checking operation 370. The violation of a CHSH inequality verifies the origin of the pairs.

Additionally, Alice and Bob need to randomly sample the population of photons to check that photons from Alice and from Bob are truly indistinguishable, as any distinguishability would provide a vector for Damon to introduce an asymmetric delay.

Figure 4:
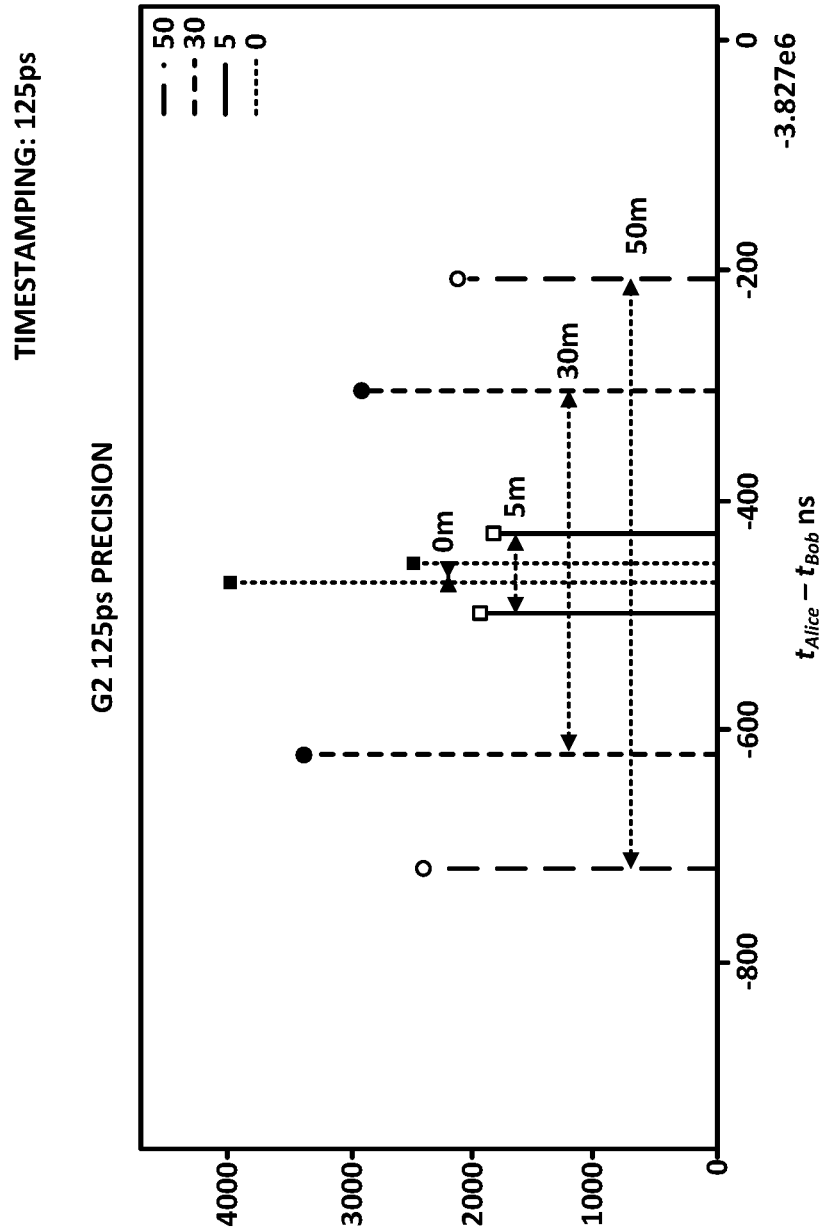
FIG. 4 illustrates cross-correlation computations from some experimental data in accordance with one or more embodiments of the present technology.

FIG. 4 illustrates cross-correlation computations from some experimental data in accordance with one or more embodiments of the present technology. The figure shows measured pairs of correlation peaks with different lengths of the quantum channel (single mode optical fiber). Each pair is connected by a double arrow dashed line and labelled with the additional length of fiber utilized. The results in the following table in FIG. 5 show that the calculated clock offset does not depend on the length of the channel within experimental error. Additional experimental data for an implementation of one embodiment can be found in the following reference which is incorporated in its entirety for all purposes: Lee, Jianwei & Shen, Lijiong & Cere, Alessandro & Troupe, James & Lamas-Linares, Antia & Kurtsiefer, Christian. (2019). Symmetrical clock synchronization with time-correlated photon pairs. Applied Physics Letters. 114. 101102. 10.1063/1.5086493. (Available at https://doi.org/10.1063/1.5086493.)

Performance and Implementations

Various implementations of these protocols use the same basic toolkit as an entanglement-based quantum key distribution (QKD) experiment. The main components are: polarization entanglement sources, single mode fibers, an optical channel, an authenticated classical channel, single photon detectors and time tagging hardware. The cross-correlation can be performed with very limited computational hardware by carefully tailoring the fast Fourier transform (FFT) calculation with only a few seconds of noisy data and not particularly good local clocks, as has been demonstrated in free-space QKD experiments.

The timing performance is fundamentally limited by a combination of detector jitter, channel jitter and intrinsic width of the second order correlation function of the Parametric Down-Conversion (PDC) emission. In accordance with various embodiments, possible interference by a malicious party and deviations from an ideal violation of a Bell inequality can affect the confidence on our time offset measurements. A recent experiment by Quan et al. that uses PDC for synchronization has demonstrated an absolute time accuracy of just under 60 ps, limited by detector and time tagging hardware, and shown that values below 10 fs are in principle possible. A full analysis of the expected performance is currently in preparation.

Security Against Delay Attacks

The security of the quantum protocol is derived from a few fundamental properties of the entangled photons used to measure the clock offset: (1) the photons are emitted from Alice's and Bob's positions at fundamentally random times, (2) both Alice's and Bob's photons travel (in opposite directions) in the same single spatial mode, the sources are designed to have the same spectra, and (4) the polarization states of the transmitted photons can't be copied with high fidelity by an adversary without detection. Notice that given the above, the direction of travel of a given photon is completely uncorrelated with any of its other degrees of freedom. This implies there is no possible way for Damon to simply filter the photons using one of the other degrees of freedom in order to isolate a photon's direction of travel and break reciprocity of the channel.

In order for an adversary to compromise the security of the quantum protocol, he must alter the propagation of photons in the single spatial mode between Alice and Bob such that a photon traveling in one direction experiences a different propagation time than one traveling in the opposite one. For example, Damon can find some way to measure the direction of travel of the photons in the channel such that (1) he knows (or at least has a high probability of knowing) when the direction measurement is successful, and (2) when successful, the direction measurement is non-destructive—both in the sense of not destroying the photon (e.g. by it being absorbed) and not altering any other degree of freedom of the photon. The first requirement comes from the fact that for success, Damon must know when a photon is passing him by in a particular direction in order to apply his chosen propagation delay, and when unsuccessful, he needs to filter out the photons he was unable to alter.

If Damon has the ability to perform a Quantum Non-Demolition (QND) measurement of the presence of a photon with high success probability at two points along the channel, then he would be able to satisfy both of the requirements above and therefore could break the security of the quantum protocol. However, the technical requirements for accomplishing such QND measurements or directly creating a controllable coherent single photon nonreciprocity in the channel are currently a serious impediment to implementing this strategy. Also, notice that the first condition for breaking the protocol implies that at least one such QND measurement is always needed for Damon's success. This is true since Demon must know with high probability when a photon is present in the channel at a particular location (and direction) in order to impose different path delays. Therefore, the proposed quantum clock synchronization protocol Is secure when the adversary does not have the capability to perform a QND measurement of the presence of a single photon. If QND capability was assumed of an adversary an additional Bell inequality using time bins could be added to the protocol.

Various embodiments of the present technology provide a new method of synchronizing two distant clocks that utilizes the properties of polarization entangled photon pairs from a spontaneous parametric down-conversion source to simultaneously distribute precise relative time information and provide the ability to authenticate this information. Authentication, in some embodiments, can be achieved by verification of quantum entanglement between the two parties by observing violation of a Bell inequality. Furthermore, the inferred relative clock offset is secure against passive, non-symmetry breaking delay attacks due to the symmetry of the protocol, and is secure against active delay attacks on individual photons because of the significant technological difficulty of producing non-destructive and non-disturbing interactions that can break the reciprocity of the single mode channel between Alice and Bob at the single photon level and with high success probability.

In addition to improved security over classical clock synchronization methods, this quantum protocol also does not require upper and lower bounds on propagation times between the two parties be known a priori. This removes any need for precise and trustworthy modeling of the communication channel or knowledge of the relative positions of the two parties, opening the possibility of ad-hoc clock synchronization between mobile stations.

Some embodiments provide an addition to the secure clock synchronization protocol based on the precision of the clock offset estimate as a function of the characteristics of the PDC sources, optical channel, and detectors. We will also analyze how the secure precision of the protocol, i.e. the achievable precision of the clock offset that is trustworthy, changes as a function of the channel noise as well as source and detector non-idealities.

Non-Reciprocal Devices

Non reciprocal devices and processes are attracting increasing attention as powerful additional resources in quantum information. This expansion of the quantum optics toolkit used to describe quantum information processes and devices, is referred to as Chiral Quantum Optics, where couplings between quantum systems can depend exclusively on the direction of propagation, leading to additional possibilities for quantum control and applications in quantum technologies. It is in this context that we consider the problem of detecting the non-reciprocity of an optical channel used for the transmission of quantum information encoded in polarization. This study was prompted by a particular application, namely the secure synchronization of remote clocks using entangled photons. In that case, a metrological task is believed to be secure under the assumption of a reciprocal channel, which naturally leads to the question of whether or not the non-reciprocity is detectable and whether the detection is robust against malicious intervention. Optical elements that utilize polarization rotation to break reciprocity necessarily induce a geometrical phase on the polarization state of a photon. When this phase is induced on polarization entangled pairs of photons, the phase is non-local and the nonreciprocity detection process is resistant to tampering by an adversary.

Breaking Reciprocity with Circulators

An optical channel is reciprocal if the state of the incoming light and the state of the outgoing light are time reversals of each other. A non-reciprocal optical element, such as a Faraday Rotator (FR), breaks this symmetry. All passive, linear, and non-magnetic optical elements are reciprocal. In the case of a channel containing a magnetic optical element such as a Faraday Rotator, if we time-reverse the channel, the direction that the polarization is rotated by the FR does not change. An optical polarization independent circulator 640 uses a FR to break reciprocity, allowing the circulator to passively route light to different ports based on its direction of travel through the device (FIG. 6) while leaving other degrees of freedom of the light unmodified in any fundamental sense.

Figure 6:
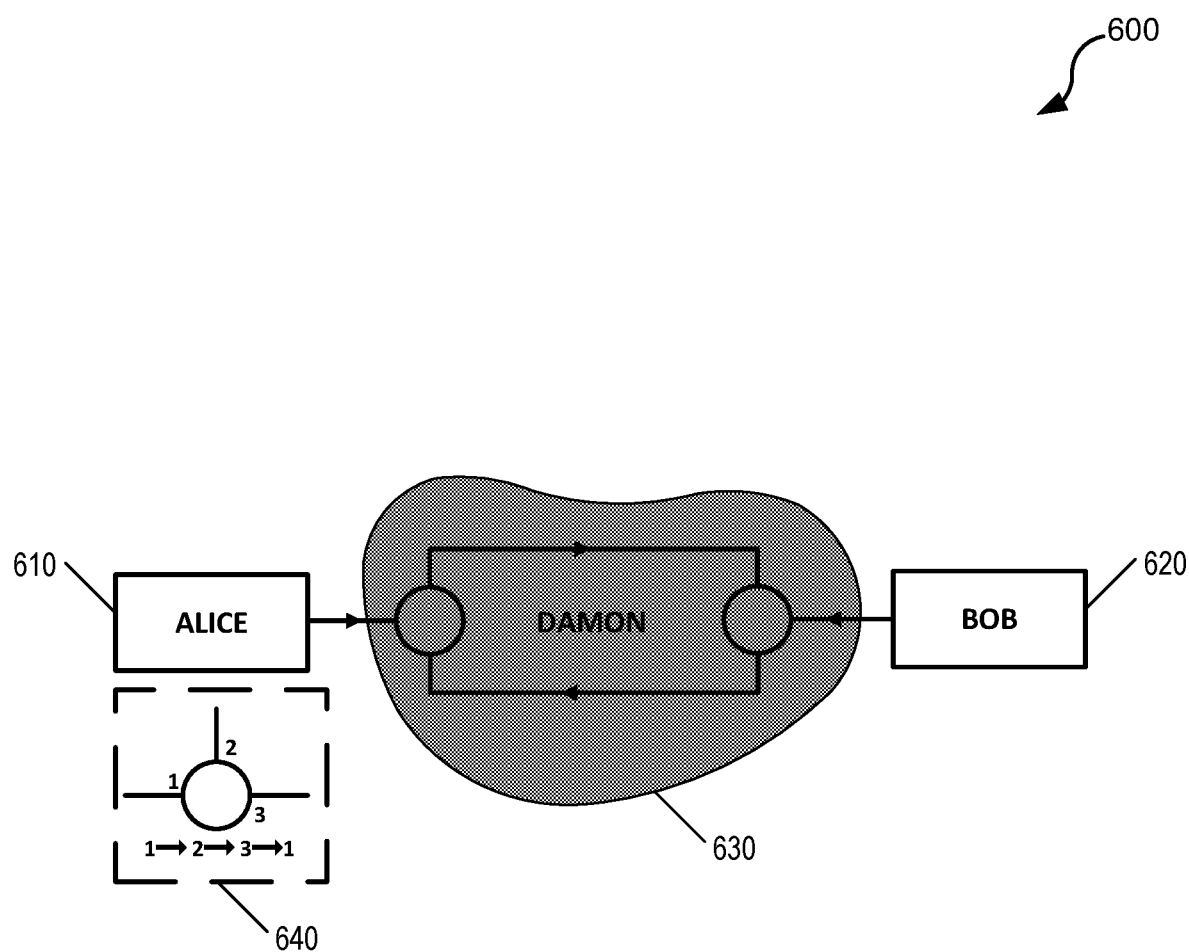
FIG. 6 illustrates a malicious party (Damon) with the use of polarization independent circulators according to various embodiments of the present technology.

In the context of the clock synchronization procedure, a natural way to break the protocol is to have the propagation time be different for photons moving from Alice 610 to Bob 620 than from Bob 620 to Alice 610. This is can be achieved by a malicious party 630 (Damon) with the use of polarization independent circulators as shown in FIG. 6. An important detail is that each circulator rotates the state through a closed loop in the Poincare sphere since the initial and final polarization state must be the same. However, the closed path followed by the polarization state as it evolves through the circulator will depend on the starting point. In practice, this means that the polarization state of the photon undergoes a full rotation in a plane defined by the physical configuration of the Faraday Rotators. The combination of two circulators allows Damon to passively introduce a direction dependent delay while preserving the polarization state of all of the individual photons propagating through the channel. If the non-reciprocity of the channel is non-detectable or, more generally, can be compensated for an arbitrary unknown input state, the protocol is broken. If, however, if there is a procedure to detect this characteristic of the channel and the detection process cannot be obscured by a malicious adversary, then an assumption of reciprocity of the channel is testable in a security-sensitive context. The following section shows that Alice and Bob may be able to detect any such attack that utilizes non-reciprocal rotation of the photons' polarization. This is due to non-local geometric phase that such a strategy may impart between the entangled photon pairs shared between Alice and Bob.

Geometric Phase of a Qubit

The photon can accumulate geometric phase as it is rotated through a closed path on the Bloch sphere. Let the initial state of the qubit be $$|\psi(t=0)\rangle = e^{-i\phi} \cos(\theta/2)|R\rangle + \sin(\theta/2)|L\rangle. \quad (1)$$

Define the overall phase of the qubit after time t to be $$|\tilde{\psi}(t)\rangle = e^{-if(t)}|\psi(t)\rangle.$$

And define the overall phase difference between the qubit state at t=0 and t=τ to be $\Delta f = f(\tau) - f(0)$.

To derive the evolution of the function $f(t)$ as the qubit rotates about the z-axis, write Schrodinger's equation for the state:

$$i\hbar \frac{d}{dt}|\tilde{\psi}(t)\rangle = i\hbar\left(-i\frac{df}{dt}e^{-if(t)}\left|\psi(t)\right\rangle + e^{-if(t)}\frac{d}{dt}\left|\psi(t)\right\rangle\right).$$

From this, we can see that $$\left\langle \tilde{\psi}(t)\left|i\frac{d}{dt}\right|\tilde{\psi}(t)\right\rangle = \frac{df}{dt} + i\left\langle \tilde{\psi}\left|e^{-if(t)}\frac{d}{dt}\right|\psi(t)\right\rangle.$$

And so, $$\frac{df}{dt} = \left\langle \tilde{\psi}(t)\left|i\frac{d}{dt}\right|\tilde{\psi}(t)\right\rangle - \left\langle \psi\left|i\frac{d}{dt}\right|\psi(t)\right\rangle$$

$$= \left\langle \tilde{\psi}(t)\left|i\frac{d}{dt}\right|\tilde{\psi}(t)\right\rangle - \frac{1}{\hbar}\langle\psi|\hat{H}|\psi(t)\rangle.$$

Integrating this over the path taken by the qubit from t=0 to t=τ, we have a total phase change $\Delta f$ given by $$\Delta f = \int_0^\tau \frac{df}{dt} dt = \beta - \frac{1}{\hbar}\int_0^\tau \langle\psi|\hat{H}|\psi(t)\rangle dt. \quad (2)$$

The first term is the geometric phase and the second term is the phase change due to the qubit's dynamics. In our analysis, we will be assuming that the dynamical phase shift is either zero or is known and has been compensated. The geometric phase is given by $$\beta = \int_0^\tau \left\langle \tilde{\psi}(t)\left|i\frac{d}{dt}\right|\tilde{\psi}(t)\right\rangle dt. \quad (3)$$

This term is nonzero because the Bloch sphere has nonzero curvature. The value of the overall phase at any chosen point on the Bloch sphere can be arbitrarily specified; however, the way a chosen phase must change as the qubit moves on the Bloch sphere is given by the curvature of the state space.

More formally, the local derivative along the qubit's path on the surface of the Bloch sphere must be invariant under U(1) gauge transformations. The requirement of U(1) invariance is a result of the qubit's state being invariant under changes in the overall phase at each point on the Bloch sphere. To make the local derivative invariant at each point, the usual derivatives must be replaced with covariant derivatives defined by a local gauge field at each point. The covariant derivative essentially defines the notion of parallel transport of a locally defined phase along the qubit's path. The gauge field is defined by $\vec{A}(R(t)) := i\langle \vec{\psi}(\vec{R}(t))|\vec{\nabla}_R|\vec{\psi}(\vec{R}(t))\rangle$, where $\vec{R}(t)$ defines the path taken on the Bloch sphere. Equation 3 says that the geometric phase can be calculated by integrating the local gauge field along the qubit's path, $$\beta = \int_0^\tau i \left\langle \bar{\psi}(\vec{R}(t)) \left| \frac{d}{dt} \right| \bar{\psi}(\vec{R}(t)) \right\rangle dt$$

$$= \oint_{path} d\vec{R} \cdot \vec{A}(\vec{R}).$$

If the path is a closed one, then we can use Stokes' Theorem to convert the path integral to an integral of the curl of the gauge field (the curvature of the Bloch sphere) over the surface enclosed by the path, $$\beta = \oint_{path} d\vec{R} \cdot \vec{A}(\vec{R})$$

$$= \int\int_{surface} d\vec{S} \cdot (\vec{\nabla} \times \vec{A}).$$

Expanding the expression for $\vec{A}$, we see that $$\vec{A} = i \langle \bar{\psi}(\vec{R}(t)) | (\vec{\nabla})_R | \bar{\psi}(\vec{R}(t)) \rangle \quad (4)$$

$$= i \langle \bar{\psi}(\vec{R}(t)) | \vec{\nabla}_R \left( e^{-if(\vec{R}(t))} \right) | \psi(\vec{R}(t)) \rangle +$$

$$i \langle \psi(\vec{R}(t)) | \vec{\nabla}_R | \psi(\vec{R}(t)) \rangle$$

$$= i \langle \psi(\vec{R}(t)) | \vec{\nabla}_R | \psi(\vec{R}(t)) \rangle + (\vec{\nabla})_R f.$$

More explicitly, using Equation 1, this becomes $$\vec{A} = i \left\langle \psi \left| \frac{\partial}{\partial \theta} \right| \psi \right\rangle \hat{\theta} + i \left\langle \psi \left| \frac{1}{\sin\theta} \frac{\partial}{\partial \phi} \right| \psi \right\rangle \hat{\phi} + (\vec{\nabla})_R f$$

$$= \frac{1}{\sin} \cos^2(\theta/2) \hat{\phi} + (\vec{\nabla})_R f.$$

Calculating the curl of the gauge field, we note that the curl of the second term above is zero—an expression of the gauge invariance of the curvature. Defining the components of $\vec{A}$ to be $A_i$, the curl of $\vec{A}$ on the surface of the Bloch sphere is given by $$(\vec{\nabla} \times \vec{A})(r=1, \theta, \phi) = \left\{ \frac{1}{r\sin\theta} \left( \frac{\partial}{\partial \theta}(A_\phi \sin\theta) - \frac{\partial A_\theta}{\partial \phi} \right) \hat{r} + \right.$$

$$\frac{1}{r} \left( \frac{1}{\sin\theta} \frac{\partial A_r}{\partial \phi} - \frac{\partial A_\phi}{\partial r} \right) \hat{\theta} +$$

$$\left. \frac{1}{r} \left( \frac{\partial}{\partial r}(rA_\theta) - \frac{\partial A_r}{\partial \theta} \right) \hat{\phi} \right\}_{r=1}$$

$$= \frac{1}{\sin\theta} \left( \frac{\partial}{\partial \theta}(\cos^2(\theta/2)) - 0 \right) \hat{r}$$

$$(\vec{\nabla} \times \vec{A})(r=1, \theta, \phi) = -\frac{1}{2}\hat{r}.$$

Therefore, we have $$\beta = \int\int_{surface} d\vec{S} \cdot (\vec{\nabla} \times \vec{A})$$

$$= -\frac{1}{2} \int\int_{surface} dS = -\frac{1}{2}\Omega,$$

where $\Omega$ is the solid angle subtended by the closed path.

In the case of the polarization state of light. In the fully quantum context, geometric phase in two-photon interference of entangled photon pairs produced by parametric down conversion has been studied in several contexts.

Geometric Phase and the Circulator Attack

Figure 7:
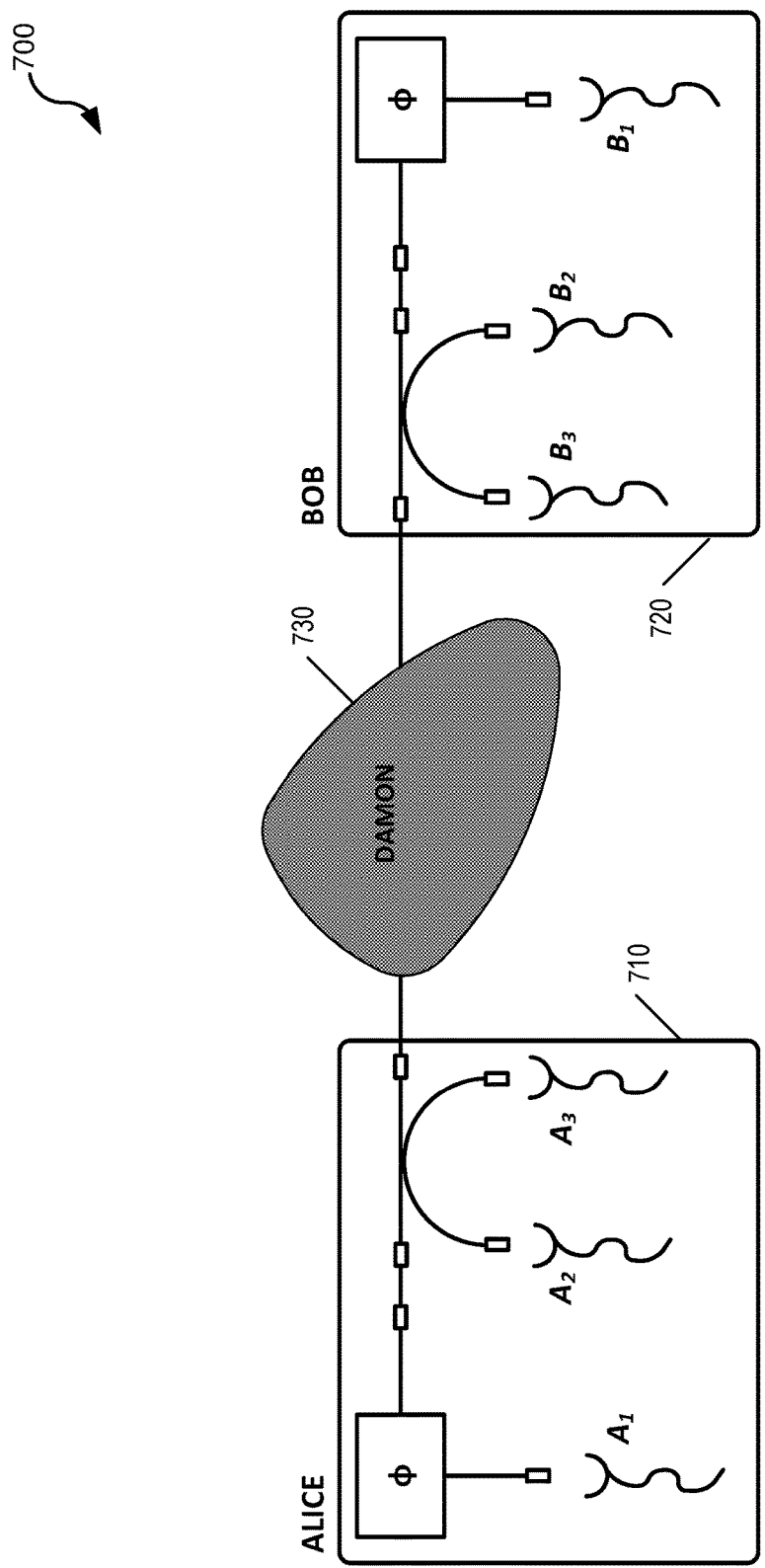
FIG. 7 Illustrates a clock synchronization protocol using entangled photons that may be used in one or more embodiments of the present technology.

Various embodiments of the present technology can use geometric phase to detect a channels non-reciprocity in the presence of a malicious adversary. FIG. 7 is an illustration 700 of a hypothetical twin circulator attack by Damon 730 on the clock synchronization protocol allowing Alice 710 to communicate with Bob 720. The dynamical phase introduced by the circulators in the channel is constrained to be equal and opposite the described geometric phase. This means that while the non-local geometric phase is imparted to the photon pairs, there is also a non-local dynamical phase of opposite magnitude imparted passively by the action of the circulators in the described attack. Various embodiments can use optical circulators can break the reciprocity of the channel and so break the security of the protocol. Some embodiments can take advantage of the properties of the geometric phase to detect such passive non-reciprocal elements and add security against non-symmetric delay attacks that use them.

The geometric phase arising from the introduction of a circulator can be detected by suitable measurements and cannot be compensated away by Damon due to its non-local nature. This is a consequence of the fact that the relevant phase is a nonlocal one defined between Alice's and Bob's qubits. The geometric phase in the quantum case is not gradually built up locally by Bob's photon as it passes through the circulators. This is a fundamental distinction between a truly quantum geometric phase, e.g. the Aharonov-Bohm effect, and any analogous classical geometric phase, for example the rotation of the plane of oscillation of a Foucault pendulum over the course of one day. An interesting implication of the distinction between quantum and classical geometric phase is that reliable detection of non-reciprocity in an adversarial context, such as the secure clock synchronization protocol in, can only be accomplished by using entangled photon pairs, since while classical light will experience an induced geometric phase, this phase is locally measurable by an adversary and can therefore be compensated.

The presence of a non-reciprocal device in an optical channel introduces a non-trivial geometric phase in the polarization of the propagating light. When the light undergoing this phase change is a photon that is part of an entangled photon pair, non-local phase can be detected. This phase change cannot be "compensated away" by a malicious party with the objective of hiding the non-reciprocal nature of the channel without breaking the symmetry of the light propagation speed in the channel for all polarization and frequencies in the exact same amount. This result has applications in secure metrology and in the understanding of non-reciprocal tools in quantum information technologies.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology may be recited as a method claim, computer-readable medium claim, or system claim, other aspects may likewise be embodied in any of these or other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
    generating pairs of entangled photons;
    locally detecting one member of each of the pairs of entangled photons;
    generating a first set of time stamps, based on a local clock, indicative of detection times that each of the one member of the pairs of entangled photons were detected locally;
    transmitting a second member of each of the pairs of entangled photons to a remote device;
    receiving, via a communication channel, arrival times of the second members of the entangled photons recorded using a remote clock at the remote device;
    receiving, from the remote device, additional photons from entangled photon pairs generated at the remote device,
        wherein each of the other member of the additional photons from the entangled photon pairs generated at the remote device were time tagged by the remote device using the remote clock;
    generating a second set of time stamps, based on the local clock, indicative of arrival time of the additional photons from the entangled photon pairs generated at the remote device;
    transmitting, via the communication channel, arrival times of the additional photons from the entangled photon pairs; and
    identifying an offset between the local clock and the remote clock based on a cross-correlation of the first set of time stamps with the arrival times of the second members received from the remote device.

2. The method of claim 1, wherein the cross-correlation includes two peaks and identifying the offset between the local clock and the remote clock includes computing half a distance between the two peaks.

3. The method of claim 1, further comprising:
    randomly sampling a population of photons that have been time stamped locally and remotely; and
    checking that the population of photons are indistinguishable.

4. The method of claim 1, wherein communication channel is a public communication channel.

5. The method of claim 1, further comprising:
    measuring a first photon polarization state of each of the one member of the pairs of entangled photons were detected locally; and
    receiving, via the communication channel, a second photon polarization state of each of the second members of the pairs of entangled photons as identified by the remote device.

6. The method of claim 1, further comprising updating a time of the local clock using the offset.

7. The method of claim 1, further comprising receiving additional photons generated at the remote device and time stamping the arrival of the additional photons based on the local clock.

8. A dual emitter and receiver comprising:
a local clock;
a source configured to generate entangled photon pairs,
wherein one member of the entangled photon pairs is coupled into a first single mode optical channel providing a local path to analyze the one member locally; and
wherein a second member of the entangle photon pairs is coupled into a second single mode optical channel providing an optical path to a remote device;
a photon polarization analyzer coupled the first single mode optical channel, wherein the photon polarization analyzer is configured to measure a polarization state of one member of the entangled photon pairs in an arbitrary basis; and
a time recordation module to measure a detection time of the one member of the entangled photon pairs, wherein the detection time is identified based on the local clock.

9. The dual emitter and receiver of claim 8, wherein the photon polarization analyzer comprises:
a collection of wave plates that allow arbitrary transformation of the polarization state of the photon; and
a beam splitter dividing the first single mode optical channel into two paths.

10. The dual emitter and receiver of claim 8, further comprising a random number generator to generate a random number that is used as an input to the photon polarization analyzer to select the arbitrary basis.

11. The dual emitter and receiver of claim 8, further comprising:
a beam splitter connected to the second single mode optical channel; and
a second photon polarization analyzer coupled to the beam splitter, the second photon polarization analyzer configured to measure the polarization state of photons arriving via the second single mode optical channel.

12. The dual emitter and receiver of claim 8, further comprising a communication module to receive time stamps of photons received at the remote device.

13. The dual emitter and receiver of claim 12, further comprising a cross-correlation analyzer to generate a cross-correlation between the time stamps received from the remote device and the detection times recorded locally.

14. The dual emitter and receiver of claim 13, wherein the cross-correlations between the time stamps and the detection times result in two peaks, and the dual emitter and receiver further comprising an adjustment module to compute an offset amount between the local clock and a remote clock from the two peaks in the cross-correlation.

15. A method comprising:
generating, at random times, pairs of entangled photons;
generating, based on a local clock, time stamps each representing a detection time that a first photon in each of the pairs of entangled photons was detected;
transmitting, via a single mode optical channel and to a remote receiver, a second photon in each of the pairs of entangled photons;
receiving, via a communication channel, arrival times of the second photon in each of the pairs of entangled photons as measured at a remote device having a remote clock and a photon polarization state of the second photon as identified by the remote device; and
identifying an offset between the local clock and the remote clock by computing a cross-correlation of the arrival time of the second photon with the time stamps of the first photon created.

16. The method of claim 15, wherein the cross-correlation includes two peaks and identifying the offset between the local clock and the remote clock includes computing half a distance between the two peaks.

17. The method of claim 15, wherein communication channel is a public communication channel.

18. The method of claim 15, further comprising:
measuring a first photon polarization state of each of the first photons of the pairs of entangled photons were detected locally; and
receiving, via the communication channel, a second photon polarization state of each of the second photons of the pairs of entangled photons as identified by the remote device.

19. The method of claim 18, further comprising correlating the first photon polarization state with the second photon polarization state to determine quantum channel security.

20. The method of claim 19, wherein the channel security includes spoofability.

21. The method of claim 15, wherein the communication channel is an encrypted communication channel.

22. The method of claim 15, further comprising receiving additional photons generated at the remote device and time stamping the arrival of the additional photons based on the local clock.

* * * * *

UNITED STATES PATENT AND TRADEMARK OFFICE
CERTIFICATE OF CORRECTION

PATENT NO. : 11,251,952 B2
APPLICATION NO. : 16/569280
DATED : February 15, 2022
INVENTOR(S) : Antia Lamas-Linares et al.

It is certified that error appears in the above-identified patent and that said Letters Patent is hereby corrected as shown below:

In the Specification

Column 12, Line 8, after "=δ" insert --+--

Column 12, Line 43, delete "$t'_1, t'_2, \ldots, t'_m$" and insert --$t'_1, t'_2, \ldots, t'_k$ and $t_1, t_2, \ldots, t_m$--

Column 17, Line 30, delete "$(\vec{\nabla})$" and insert --$\vec{\nabla}$--

Column 17, Line 35, delete "$(\vec{\nabla})$" and insert --$\vec{\nabla}$--

Column 17, Line 42, delete "$(\vec{\nabla})$" and insert --$\vec{\nabla}$--

Column 17, Line 44, delete "$(\vec{\nabla})$" and insert --$\vec{\nabla}$--

Column 17, Line 44, after "sin" insert --θ--

Signed and Sealed this
Fifteenth Day of November, 2022

Katherine Kelly Vidal
*Director of the United States Patent and Trademark Office*